April 18, 1933.   F. L. BRONSON   1,904,268
METHOD FOR THE MANUFACTURE OF FORMED ARTICLES
Filed March 8, 1932   3 Sheets-Sheet 1
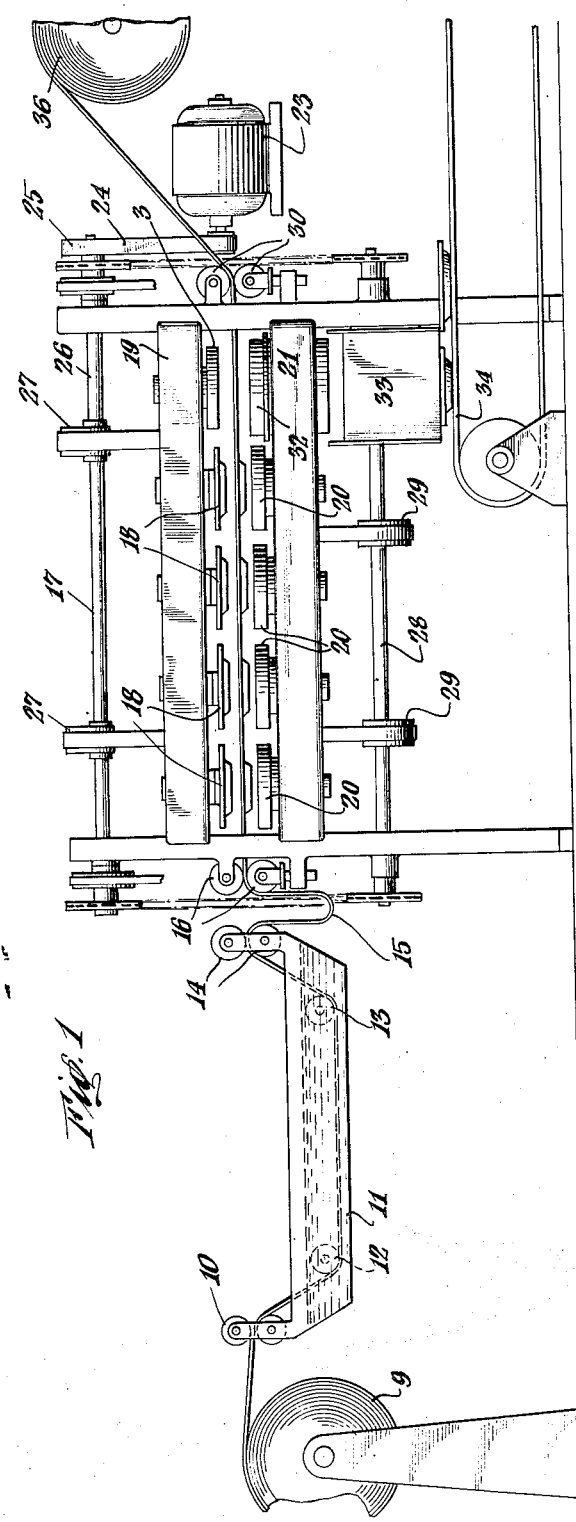
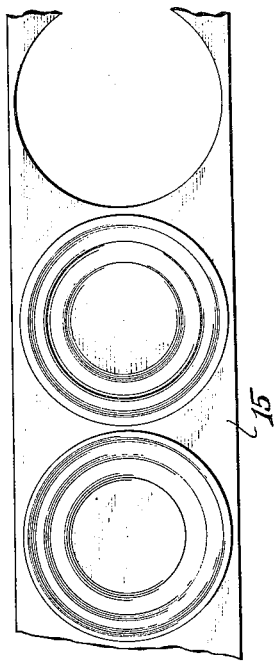
INVENTOR
Fred L. Bronson
BY
ATTORNEYS April 18, 1933. F. L. BRONSON 1,904,268
METHOD FOR THE MANUFACTURE OF FORMED ARTICLES
Filed March 8, 1932 3 Sheets-Sheet 2
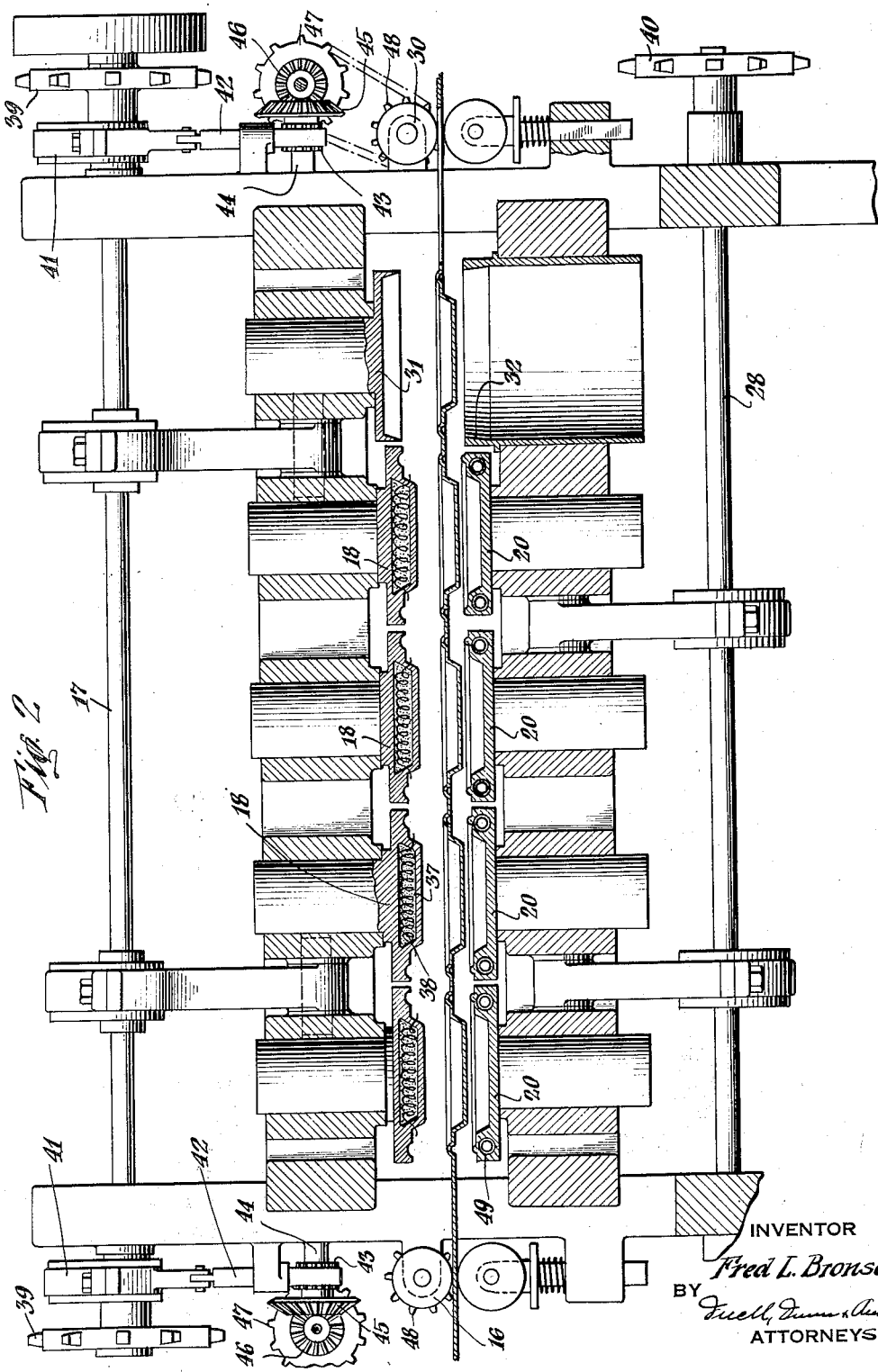
INVENTOR
Fred L. Bronson
BY
ATTORNEYS April 18, 1933.  F. L. BRONSON  1,904,268
METHOD FOR THE MANUFACTURE OF FORMED ARTICLES
Filed March 8, 1932   3 Sheets-Sheet 3
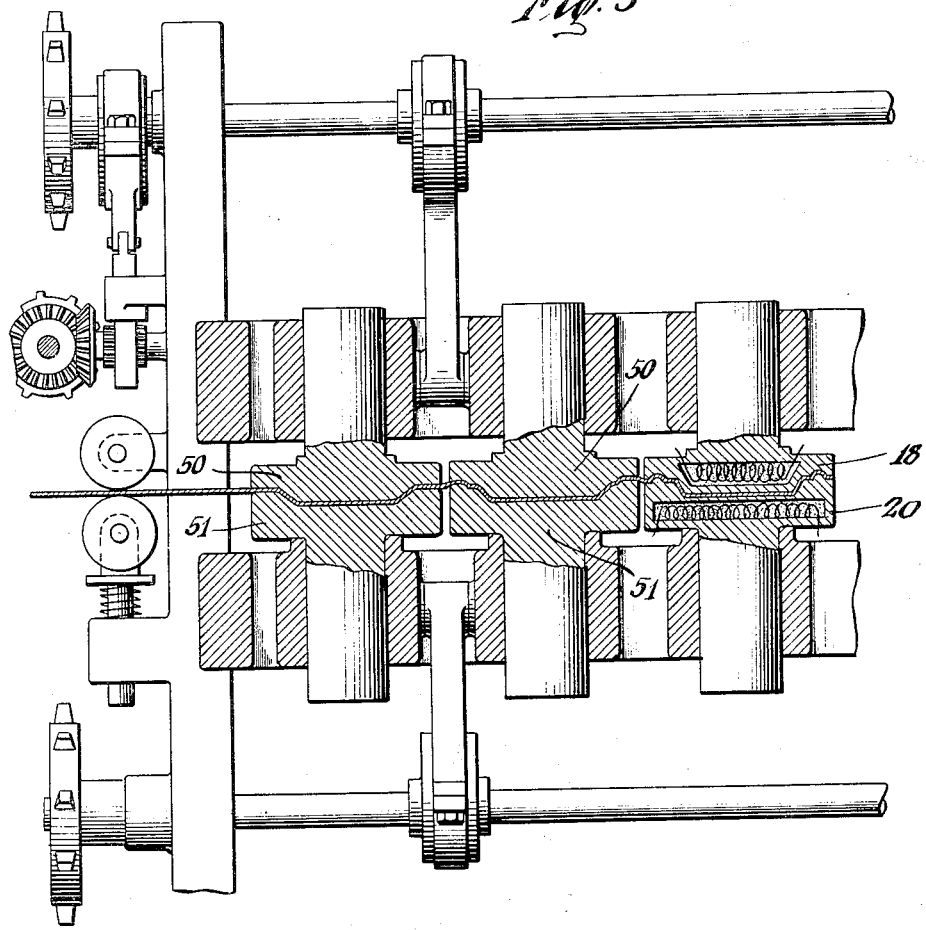
INVENTOR
Fred L. Bronson
BY
ATTORNEYS Patented Apr. 18, 1933

1,904,268

UNITED STATES PATENT OFFICE

FRED L. BRONSON, OF NEW YORK, N. Y.

METHOD FOR THE MANUFACTURE OF FORMED ARTICLES

Application filed March 8, 1932. Serial No. 597,535.

This invention relates to the manufacture of formed articles and relates more particularly to the formation of articles from fibrous material such as paper.

An object of the invention is to manufacture formed articles substantially without wrinkles or other irregularities.

Another object of the invention is to manufacture formed articles having smooth surfaces economically and on a quantity production basis.

Another object of the invention is to form articles in a continuous sheet of material and to cut them from the sheet after forming.

Another object of the invention is to form, by the application of pressure and heat, articles from a continuous sheet of fibrous material, the articles being cut from the sheet after formation.

Another object of the invention is to provide a continuous process for the economic manufacture of formed articles.

Another object of the invention is to provide apparatus for forming articles from moistened sheet material by the application of pressure and heat.

Other objects of the invention will be apparent from the following description taken in connection with the drawings.

In one embodiment of this invention, a continuous sheet of paper stock is passed through a moistening bath to loosen the fibres of the paper to place it in condition for deformation by a following stamping or pressing operation. After leaving the bath, it passes through a pair of squeeze rollers which act both to remove excess moisture from the sheet and to press the moisture carried on the surface thereof into the sheet. The moistened sheet next passes into a stamping press, associated mechanism of which advances the paper into the press intermittently as required by stamping operations which follow. The press comprises four substantially similar pairs of dies which are moved together under pressure to form the plate, the dies being heated to assist in the forming and drying operation. The plate is formed in the sheet by pressure of the first pair of heated dies. The plate is formed in substantially its final form by this first pressing operation and is partially dried; the dies are then separated to permit the escape of vapor and the dies are again placed together to more completely form and dry the plate, and to iron out wrinkles or any other irregularities which may be present. The dies are again separated to permit the escape of vapor and the plate is advanced into the path of another pair of heated dies which are pressed together to advance the perfection of the formed plate and are then separated to permit the escape of vapor. The plate still in the sheet is next carried into the fourth pair of dies where it is again pressed by the action of the heated dies to heat and complete the pressing of the plate in order that it may be in the next step cut from the sheet. The dies are then separated to permit the escape of vapor and to permit the plate to pass in line with a cutting die which severs the plate around its periphery from the moistened sheet, the separated plate dropping onto a conveyer which carries it to be stacked or otherwise disposed of. The remainder of the sheet is passed out of the press and may be wound on a roller for any suitable disposition.

In another embodiment of the invention, the moistened sheet, after it leaves the squeeze rollers, passes between a pair of unheated dies which are placed together to partially form the plate, then between another pair of unheated dies which more completely form the plate. The partially formed plate is then advanced with the sheet between the pairs of heated dies, such as described in connection with the other embodiment of the invention, the first pair of heated dies acting to substantially complete the forming of the plate and to partially dry same, and the other pairs of heated dies acting to smooth out wrinkles and irregularities to complete the formation of and to more completely dry the plate before it is cut from the sheet.

According to a feature of this invention, the plate is subjected to pressure to form it in substantially its final form, either before or at the time that any substantial drying of the plate takes place. This is true irrespective of whether the forming operation is completed in one die or in a succession of dies, and is important because any substantial drying of the plate before being brought to its final form, may interfere with, or prevent, the movement of the fibres in the forming operation and may result in an imperfect product.

The invention will now be described with reference to the drawings, of which:

Fig. 1 is a diagrammatic view of apparatus arranged in sequence to practice the method of this invention;

Fig. 2 is an enlarged view partially in section of the stamping press of Fig. 1;

Fig. 3 is a side, sectional view of a plate formed according to this invention;

Fig. 4 is a plan view looking downward on the paper sheet at that stage in its process where plates have been formed in and another plate has been cut from the sheet;

Fig. 5 is a partial side view, partially in section, of a stamping press utilizing unheated as well as heated dies;

Fig. 6 is a sectional side view of a plate formed by the first pair of unheated dies of Fig. 5, and Fig. 7 is a sectional side view of a plate formed by the second pair of unheated dies of Fig. 5.

Referring now to Fig. 1, a roll of paper stock having suitable characteristics is indicated at 9. The paper sheet from the roll passes through a pair of guide rollers 10 into the moistening bath 11 where it passes under the guide rollers 12 and 13 below the surface of the contained water. The moistened paper sheet next passes between the pair of squeeze rollers 14 which act to press moisture carried by the sheet into its fibres and to remove any excess moisture from the sheet. The sheet next passes from the squeeze rollers 14 and hangs in a festoon 15 which provides sufficient slack in the paper to prevent any undue tension occurring in its intermittent movement. The sheet then passes between the pair of feed rollers 16 which are actuated by mechanism associated with the stamping press, indicated generally by 17, to advance the sheet into the press in a series of intermittent feeding motions. The driving of the feed rollers 16 will be explained later in the discussion of Fig. 2. The stamping press 17 comprises the four male dies 18 which are mounted to the lever 19 and the four female dies 20 which are carried by the lever 21. The dies are electrically heated. The arrangement of the heating coils will be explained in more detail in the discussion of Fig. 2. The electric motor 23 drives through the medium of the belt 24, the pulley 25, which revolves the shaft 26 on which are mounted eccentrics 27, which act to raise and lower the lever 19 once during each revolution of the shaft 26. The shaft 28 is driven simultaneously with the shaft 26 and on it are mounted the eccentrics 29 which raise and lower the lever 21 simultaneously with the raising and lowering of the lever 19 by the action of the eccentrics 27 on the shaft 26. The feed rollers 30 are driven by mechanism from the stamping press in the same manner as the feed rollers 16 are, and these two pairs of feed rollers act to feed the sheet intermittently into and out of the stamping press. The lever 19 also carries a pair of cutting dies 31 and 32 which act to cut the formed article from the sheet after it has been completely formed between the pairs of dies 18 and 20.

In operation, the moistened sheet from the bath 11 is fed by the feed rollers 16 into the stamping press 17, the feeding mechanism being so arranged in association with the stamping mechanism that the sheet comes to rest between the pairs of dies 18 and 20 when the dies are coming together to form the molded article. The moistened sheet first passes between the first pair of dies 18 and 20 at the extreme left of the stamping press 17 (facing the drawing). The mechanism of the press forces the dies 18 and 20 together to deform the fibres of the moistened sheet, to form the plate shown by Fig. 3. The upper die 18 and the lower die 20 are heated and during the pressing operation, the fibres of the sheet are deformed by pressure, and the formed plate is partially dried by the application of heat. The first pair of dies 18 and 20 are so designed that the plate is formed in substantially its final form in this first pressing and heating operation. Vapor is formed during this first heating and pressing step and in order to form a perfect plate, this vapor must be allowed to escape, so by the action of the eccentrics 27 and 29, during the constant revolution of the shafts 17 and 28 by rotation of the motor 23, the dies 18 and 20 are separated to permit the escape of vapor, and the sheet is advanced by the action of the feed rollers 16 and 30 until the plate, which has been formed by the first pair of dies 18 and 20, is now in position between and in line with the second pair of dies 18 and 20. This second pair of dies 18 and 20 now come together and fit into the plate formed by the first pair of dies to again press the fibres in the formed plate in their proper position, to smooth out inequalities, and to more completely dry the formed plate. In the meantime, the first pair of dies 18 and 20 are forming a second plate in the sheet in the manner described above. The dies are again separated by the action of the eccentrics, vapor is permitted to escape, and the sheet is again advanced by the action of the feed rollers until the first formed plate is between and in line with the third pair of dies, the second formed plate is between and in line with the second pair of dies, and a blank sheet area is between the first pair of dies to be deformed by the next pressing operation. The dies are again brought together by the action of the eccentrics, the first plate is again pressed and heated to more firmly press the fibres in their proper position, to smooth out any wrinkles, and to more completely dry same. The second pair of dies act to perfect the second formed plate, and the first pair of dies act, as has been described above, to form another plate from the blank sheet and to partially dry the same plate. The dies are again separated by the action of the eccentrics, vapor is permitted to escape, and the sheet is again moved forward by the action of the feed rollers until the first formed plate is between and in line with the fourth pair of dies, the second formed plate is between and in line with the third pair of dies, the third formed plate is between and in line with the second pair of dies, and a blank sheet portion is between the first pair of dies. The dies are then moved together through the action of the eccentrics, and the fourth pair of dies completes the smoothing, the pressing, and the heating of the first formed plate, the third pair of dies heats, smooths, and presses the second formed plate, the second pair of dies heats, smooths and presses the third formed plate, and the first pair of dies forms a fourth plate from the paper sheet. The dies are again separated, the vapor being released from the plates between each of the four pairs of dies, and the sheet is moved forward until the first formed plate is between and in line with the cutting edges of the cutting dies 31 and 32. The dies are then again pressed together, the first formed plate is cut by the dies 31 and 32 from the sheet and falls through the passageway 33 onto the conveyer 34, as indicated by the drawings. Each of the pairs of dies 18 and 20 in the meantime have assisted in the pressing, smoothing, and drying of the plates, and as the stamping press 17 continues to operate, the plates continue to be formed by the dies 18 and 20, separated from the sheet by the pair of cutting dies 31 and 32, and to then drop onto the conveyer 34. The remainder of the paper sheet from which the paper plates have been cut is wound on the roll 36 which may be rotated in any convenient fashion, and, when it approaches a predetermined bulk, may be disposed of in any manner.

Fig. 2 shows some of the details of the stamping press 17 of Fig. 1. Many of the details are obvious to those skilled in the art and will not, for the sake of simplicity, be explained here. The male member 18 of the second pair of dies is shown in section and is seen to contain in a hollowed out portion 37, the coils of electrical resistance wire 38 which are heated by the application of electrical current to a temperature sufficient to heat the outside of the die 18 to its proper temperature. The female dies 20 are similarly heated by the coils of resistance wire 49.

The shaft 17 carries at its outer extremities the sprocket wheels 39 and a chain connects the sprockets 39 with the sprocket wheels 40, only one of which is shown, which are carried on the extremities of the shaft 28. The motor 23 revolves the shaft 17, and the shaft 17, in turn, revolves the shaft 28 through the intermediary of the sprockets 39, 40, and their connecting driving chain. The shaft 17 also carries near its extremities the eccentrics 41 to which are connected the sliding shafts 42 which, during each revolution of the shaft 17, are raised and lowered once. On the back sides of the shafts 42 are formed gear teeth so that the lower end of the shafts are racks and engage with the pinions 43. The pinions 43 are mounted on the shaft 44 in the manner of an overrunning clutch so that as the pinions 43 are revolved in one direction, the shaft 44 is revolved, and, when the pinion is revolved in the other direction, the shafts 44 remain stationary. The shafts 44 carry the bevel gear 45 which is in mesh with bevel gears 46 to revolve same. The bevel gears 46 revolve the sprockets 47 over which connecting chains pass to revolve the sprocket wheels 48, one of which is mounted to the upper of the feed rollers 16 and the other of which is mounted to the upper of the feed rollers 30. As the shaft 17 is rotated, the movement of the eccentric 41 raises and lowers the shaft 42 to revolve intermittently in one direction the pinion 44 which, in turn, revolves intermittently in one direction the sprockets 47 and 48 to in turn move the feed rollers 16 and 30 intermittently, and in one direction which, in turn, advance the moistened sheet intermittently through the stamping process.

The stamping press shown by Fig. 5 is similar to that of Figs. 1 and 2, except that two unheated pairs of male dies 50 and female dies 51 are provided ahead of the heated dies to deform the moistened sheet before it is acted upon by the heated dies 18 and 20. This form of press, utilizing both heated and unheated dies, may be used in one embodiment of the invention to replace the press 17 of Fig. 1. Similar co-operating mechanisms common to both Figs. 2 and 5 have been given the same designation numerals. The first pair of unheated dies 50 and 51 are shaped to only partially form the plate, and the second pair of unheated dies are shaped to more completely form the plate. In operation, with the stamping press of Fig. 5 utilized to replace the stamping press 17 of Fig. 1, the moistened sheet, after leaving the squeeze rollers 14, is advanced by the feed rollers 16 between the first pair of unheated dies 50 and 51 which are shaped to partially form the plate, as shown by Fig. 6, when pressed together. The partially formed plate in the next operation is advanced to a position between the second pair of unheated dies 50 and 51 which are pressed together to more completely form the plate, as shown by Fig. 7. The partially formed plate, in the next operation, is advanced to a position between the first pair of heated dies, which are shaped, as described in connection with Fig. 2, to form the plate in substantially its final form and which are heated to dry the formed plate. The method from the time the partially formed plate is placed between the first pair of heated dies is the same as that described in the explanation of the method employed with Figs. 1 and 2 and so will not be repeated here.

While it is preferred that the moisture step comprise passing the sheet through water, obviously it could be moistened by application of wet steam, water spray, vapor, or in any other suitable manner.

While it is preferred that each of the four pairs of heated dies apply heat and pressure to the plate, obviously the first pair, or any other pair of dies could apply heat only or pressure only, and the other pairs of dies could exert heat and/or pressure to satisfactorily form the plate according to this invention.

While, for the purpose of illustration, a portion of the driving mechanism has been described as comprising sprockets and driving chains, it is realized that under actual manufacturing conditions, such drives would be accomplished by gearing and driving shafts. Likewise, other details of the apparatus have been described in the most simple fashion to enable the invention to be easily understood, and it is, of course, realized that the details thus described for the purpose of simplicity could probably be considerably modified to take care of manufacturing requirements. For example, instead of moving both male and female dies, only one of the dies may be moved and the formed plate may be removed by an air jet or any suitable mechanism from the dies to permit the travel of the sheet.

It is seen that, according to this invention, a simple manufacturing method has been evolved which will enable products of the highest quality to be manufactured on an economic quantity basis. By feeding the material in continuous sheet form through the stamping press, it is possible to most advantageously moisten the portion of the material that is to be later formed. Furthermore, the sheet itself is advanced simply from the preliminary roll, through the moistening bath, and through the stamping press. It is not necessary to provide elaborate transfer mechanism, such as is required where the paper blanks are cut from a sheet in a step preliminary to the operations. Furthermore, by feeding the sheet continuously, the moistening may be accomplished much more advantageously than were the blanks first cut, then moistened, and then formed. Furthermore, the action of the squeeze rollers in pressing moisture into the sheet and in removing excess moisture, places the material in better condition to be more easily deformed and to provide a product of smoother appearance.

In addition to the above features, which taken alone place this invention above what has been done before, the method of forming and perfecting the article in several stamping operations, taken separately or in combination with the foregoing features, has been found necessary in order to produce a formed article which has a higher quality than those manufactured heretofore, but which at the same time may be manufactured more cheaply. The plurality of substantially similar stamping and heating operations each act in conjunction with the other of the stamping and heating operations to complete the perfect formation of the plate. In the first heating and pressing operation, the plate is pressed in substantially its final form and is partially dried by the application of heat. Vapor is, of course, formed from the moist material, and the pressing and heating is discontinued to permit this vapor to escape. Wrinkles and other inequalities are usually formed in the first stamping operation, and these are reduced in a following pressing and heating operation. Not only are the wrinkles or other inequalities smoothed out, but the plate is further dried and the fibres are again pressed more firmly, tending to cause the plate to remain in its desired final form. The pressing and heating are discontinued again to permit the escape of vapor, and in two additional operations, the heating and pressing are applied to complete the smoothing together with the permanent formation of the fibres, and sufficiently drying the plate, thus causing it to remain in the desired shape.

While it is preferred for manufacturing purposes that the plate be progressively advanced through successive pairs of dies, it should be realized, of course, that mechanism may be provided whereby the plate, after having been acted upon by one pair of heated dies, for example, may be held in position between this same pair of heated dies, which, in a following operation, may again be pressed together to again heat and smooth the plate. Thus, in one form of the invention, the four pairs of heated dies of the stamping press 17 could be replaced by a single pair of dies, this single pair of dies acting upon the plate four times before it is passed to the cutting dies, thus accomplishing the result arrived at by the plurality of pairs of dies of the stamping press illustrated.

Whereas one or more embodiments of the invention have been described for the purpose of illustration, it should be understood that the invention is not limited to the precise details described, but is capable of considerable departure from the described details without departure from the spirit of the invention.

What is claimed is:

1. The method of forming an article which comprises moistening sheet material, heating and pressing the moist sheet to form the article in substantially its final shape, permitting the escape of the vapor formed thereby, and again heating and pressing the article to more completely dry same.

2. The method of forming an article which comprises moistening sheet material, heating and pressing the moistened sheet to form the article in substantially its final form and to partially dry same, discontinuing the pressing and heating to permit the escape of vapor, and again heating and pressing the partially shaped article to more completely shape and dry same.

3. The method of forming an article which comprises pressing a moistened sheet to form the article, heating and pressing the article to more completely form and partially dry same, discontinuing the heating and pressing to permit the escape of vapor, and heating and pressing the article in another step to complete the forming of and to more completely dry same.

4. The method of forming an article which comprises moistening sheet material, pressing said material to form the article in substantially its final form, and heating and pressing said article to complete the forming and to dry same.

5. The method of forming an article which comprises moistening sheet material, pressing said material to form the article in substantially its final form, and heating and pressing the article to more completely form and to dry same.

6. The method of forming an article which comprises moistening sheet material, heating and pressing said material to form an article in substantially its final form and to partially dry same, discontinuing the heating and pressing to permit the escape of vapor, and further heating and pressing the article to more completely heat and dry same.

7. The method of forming an article which comprises feeding a continuous sheet of fibrous material through a moistening bath, pressing a portion of the sheet to form the article, pressing and heating to complete the article, pressing and heating to complete the formation of the article and to dry same, and then cutting the formed article from the sheet.

8. The method of forming an article which comprises feeding a continuous sheet of fibrous material through a moistening operation, pressing and heating a portion of the moistened sheet to form the article in substantially its final form, permitting the escape of the vapor formed thereby, again heating and pressing the article to more completely dry same, and cutting the formed article from the sheet.

9. The method of forming an article which comprises feeding a continuous sheet of fibrous material through a moistening operation, pressing a portion of the moistened sheet to form the article in substantially its final form, pressing and heating to partially dry and form same, discontinuing the heating and pressing to permit the escape of vapor, again heating and pressing the article to more completely form and dry same, and cutting the formed article from the sheet.

10. The method of forming an article which comprises feeding a continuous sheet of fibrous material through a moistening bath, pressing the moisture into said sheet, pressing and heating a portion of the sheet to form the article in substantially its desired shape and to partially dry same, substantially completing the drying of the article in a further heating and pressing operation, and cutting the formed article from the sheet.

11. The method of forming an article which comprises feeding a continuous sheet of fibrous material through a moistening bath, pressing moisture into the sheet, removing excess moisture therefrom, pressing and heating a portion of the sheet to form the article in substantially its final form, again heating and pressing the article to more completely dry same, and cutting the formed article from the sheet.

12. The method of forming an article which comprises feeding a continuous sheet of fibrous material through a moistening bath, pressing moisture into the sheet and removing excess moisture therefrom, pressing and heating a portion of the moistened sheet to substantially form the article in its final form and to partially dry same, discontinuing the pressing and heating to permit the escape of steam, again heating and pressing the partially dried article to more completely form and dry same, and cutting the formed article from the sheet.

13. The method of forming an article which comprises feeding a continuous sheet of fibrous material through a moistening bath, pressing moisture into the sheet, pressing a portion of the moistened sheet to form the article in substantially its final form, pressing and heating the article to further form and partially dry same, discontinuing the pressing to permit the escape of vapor, again heating and pressing the article to more completely form and dry same, and cutting the formed article from the sheet.

14. The method of forming an article which comprises feeding a continuous sheet of fibrous material through a moistening bath, pressing and heating a portion of said material to form the article in substantially its final form, again pressing and heating the article to more completely form and to dry same, and cutting the formed article from the sheet.

15. The method of forming an article which comprises feeding a continuous sheet of fibrous material through a moistening bath, pressing moisture into the sheet, pressing and heating a portion of said sheet to form the article in substantially its final form and to partially dry same, discontinuing the heating and pressing to permit the escape of vapor, again heating and pressing the article to completely form and to dry same, and cutting the formed article from the sheet.

16. The method of forming an article which comprises pressing a moistened sheet to partially form an article, pressing the partially formed article to more completely form same, heating and pressing the article to partially dry same, discontinuing the heating and pressing to permit the escape of vapor, and again heating and pressing the article to complete the forming of and to more completely dry same.

17. The method of forming an article which comprises moistening sheet material, pressing said material to partially form the article, and pressing and heating the partially formed article to complete the forming and to dry same.

18. The method of forming an article which comprises moistening sheet material, pressing said material in a plurality of operations to progressively form same, and heating and pressing said article to complete the forming and to dry same.

In testimony whereof I affix my signature.

FRED L. BRONSON.